United States Patent
Lee

(10) Patent No.: US 9,965,613 B2
(45) Date of Patent: May 8, 2018

(54) METHOD AND SYSTEM FOR USER SESSION DISCOVERY

(75) Inventor: Jong Lee, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 307 days.

(21) Appl. No.: 13/095,631

(22) Filed: Apr. 27, 2011

(65) Prior Publication Data

US 2012/0144024 A1 Jun. 7, 2012

Related U.S. Application Data

(60) Provisional application No. 61/419,780, filed on Dec. 3, 2010.

(51) Int. Cl.
| | | |
|---|---|---|
| *G06F 15/173* | (2006.01) | |
| *G06F 21/41* | (2013.01) | |
| *H04W 4/00* | (2018.01) | |
| *H04L 29/08* | (2006.01) | |

(52) U.S. Cl.
CPC .............. *G06F 21/41* (2013.01); *H04L 67/14* (2013.01); *H04W 4/003* (2013.01)

(58) Field of Classification Search
CPC ............. H04L 29/08621; H04L 67/146; H04L 29/06768; H04L 63/0815; H04L 67/1027; H04L 67/143; H04L 67/1006; H04L 67/14; H04L 67/1002; H04L 63/168; H04L 67/1004; G06F 21/41; G06F 21/6263; G06F 2221/2115
USPC ............ 726/2, 3, 5, 8, 1, 7, 17, 21; 713/155
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

*Primary Examiner* — Vivek Srivastava
*Assistant Examiner* — Muhammad Raza
(74) *Attorney, Agent, or Firm* — Lorenz & Kopf LLP

(57) ABSTRACT

Systems and methods are described to validate user connections to one or more application servers within a multi-tenant application system. A domain-level cookie at the client identifies any active connections for that client. As the client requests a connection to a particular application, the cookie is provided to a validation server that determines if any previously-established sessions with the multi-tenant system exist, and/or if such sessions remain active. If an active session already exists, then the client can be redirected to a particular server to continue the previously-established session. If no valid prior sessions are available, then the client can be validated and a new connection to an appropriate server can be established, as appropriate.

18 Claims, 2 Drawing Sheets

(56) References Cited

U.S. PATENT DOCUMENTS

Figure 1:
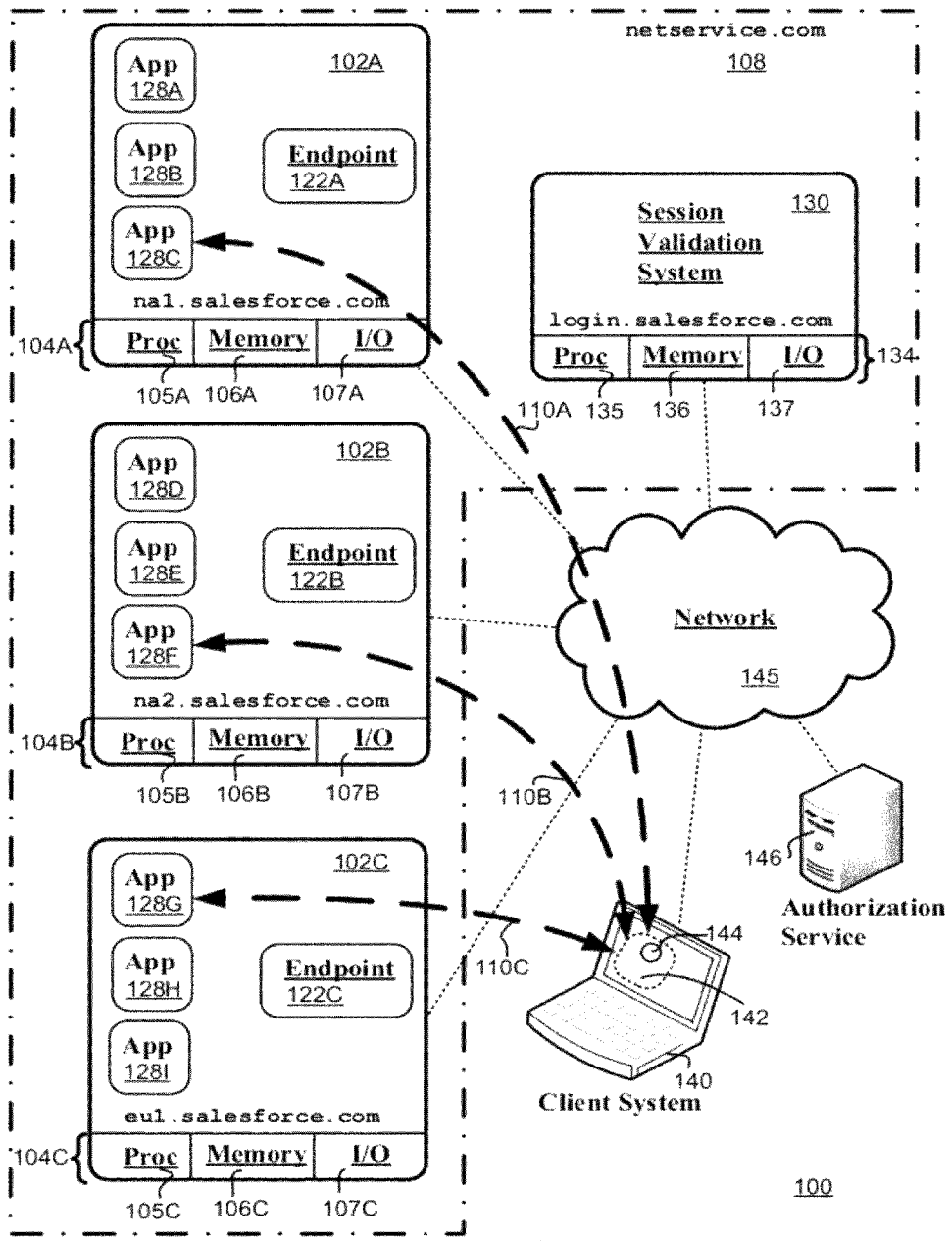

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,468 B2 * | 7/2004 | Gupta et al. .................. 726/2 |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,650,402 B1 * | 1/2010 | Batz ................... H04L 67/1002 709/224 |
| 7,673,045 B1 * | 3/2010 | Battle ..................... G06F 21/41 709/219 |
| 7,698,160 B2 | 4/2010 | Beaven et al. |
| 7,950,055 B2 * | 5/2011 | Blinn et al. ....................... 726/21 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,219,802 B2 * | 7/2012 | Doleh et al. ................... 713/155 |
| 8,275,836 B2 | 9/2012 | Beaven et al. |
| 8,590,014 B1 * | 11/2013 | Haugsnes ............... G06F 21/31 726/3 |
| 2001/0044791 A1 | 11/2001 | Richter et al. |
| 2002/0019827 A1 * | 2/2002 | Shiman ............ G06F 17/30011 |
| 2002/0072951 A1 | 6/2002 | Lee et al. |
| 2002/0082892 A1 | 6/2002 | Raffel |
| 2002/0099936 A1 * | 7/2002 | Kou ..................... H04L 63/0442 713/151 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0024881 A1 * | 2/2004 | Elving ................. H04L 67/1008 709/227 |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249429 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0204041 A1 * | 9/2005 | Blinn ................... H04L 63/0815 709/225 |
| 2006/0155857 A1 * | 7/2006 | Feenan et al. ................. 709/227 |
| 2006/0277596 A1 * | 12/2006 | Calvert et al. .................... 726/3 |
| 2008/0021866 A1 * | 1/2008 | Hinton ................... G06Q 10/10 |
| 2009/0150485 A1 * | 6/2009 | Kawabata et al. ............ 709/203 |
| 2009/0177778 A1 * | 7/2009 | Turk ................. H04L 29/08729 709/227 |
| 2009/0249439 A1 * | 10/2009 | Olden et al. ....................... 726/1 |
| 2009/0282239 A1 * | 11/2009 | Doleh ................... G06F 21/335 713/155 |
| 2011/0202988 A1 * | 8/2011 | Otranen et al. ..................... 726/8 |
| 2011/0252127 A1 * | 10/2011 | Iyengar ................. G06F 9/5033 709/224 |
| 2011/0307940 A1 * | 12/2011 | Wong ..................... G06F 21/31 726/4 |
| 2011/0321131 A1 * | 12/2011 | Austel ..................... G06F 21/33 726/4 |
| 2011/0321133 A1 * | 12/2011 | Grieve .................... G06F 21/31 726/4 |
| 2012/0017094 A1 * | 1/2012 | Tulchinsky ......... G06F 21/6263 713/182 |

* cited by examiner

METHOD AND SYSTEM FOR USER SESSION DISCOVERY

PRIORITY CLAIM

This application claims priority to U.S. Provisional Application Ser. No. 61/419,780, which was filed on Dec. 3, 2010 and is incorporated herein by reference.

TECHNICAL FIELD

The following relates to data processing systems and processes that use common network-based platforms to support multiple applications executing on behalf of multiple tenants.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model provides applications over the network "as a service". The cloud computing model can often provide substantial cost savings to the customer over the life of the application because the customer no longer needs to provide dedicated network infrastructure, electrical and temperature controls, physical security and other logistics in support of dedicated server hardware.

In particular, cloud-based architectures that simultaneously support multiple tenants have been developed to improve collaboration, integration and community-based improvement between tenants without sacrificing data security. Generally speaking, multi-tenancy refers to a system wherein a single hardware and software platform simultaneously supports multiple customers or other groups of users from a common data store. The shared platform in the multi-tenant architecture is usually designed to virtually partition data and operations so that each tenant works with a unique virtual application instance. The Force.com service available from salesforce.com of San Francisco, Calif., for example, provides an application-centric approach that abstracts the server hardware altogether and that allows multiple tenants to simultaneously yet securely implement a wide variety of applications that are accessible via the Internet or a similar network.

As noted above, multi-tenant application systems can allow users to access data and services that are associated with any number of different organizations. Often, these multi-tenant systems are developed with multiple server instances to provide redundancy, load balancing, geographic distribution and other benefits. In many cases, each server instance resides at a unique domain (or subdomain) on the Internet or another network. Sessions established with a server at a particular domain can be readily managed using, for example, conventional cookies that track hypertext transport protocol (HTTP) or other session information for connections within that domain. Conventional cookies, however, are generally limited because they are not typically accessible to sessions with other domains. If a particular client initially establishes a connection with a first server residing within a first domain, for example, a subsequent connection to a second server at a second domain would not typically be able to view or process information relating to the first session, since the second server resides in a separate domain. This can create any number of challenges in implementation. If the user accesses the same application hosted on different servers, for example, and/or if the same user accesses different applications hosted on different servers, it can be challenging to track the various connections across multiple domains or sub-domains of the application server.

DESCRIPTION OF THE DRAWING FIGURES

Figure 2:
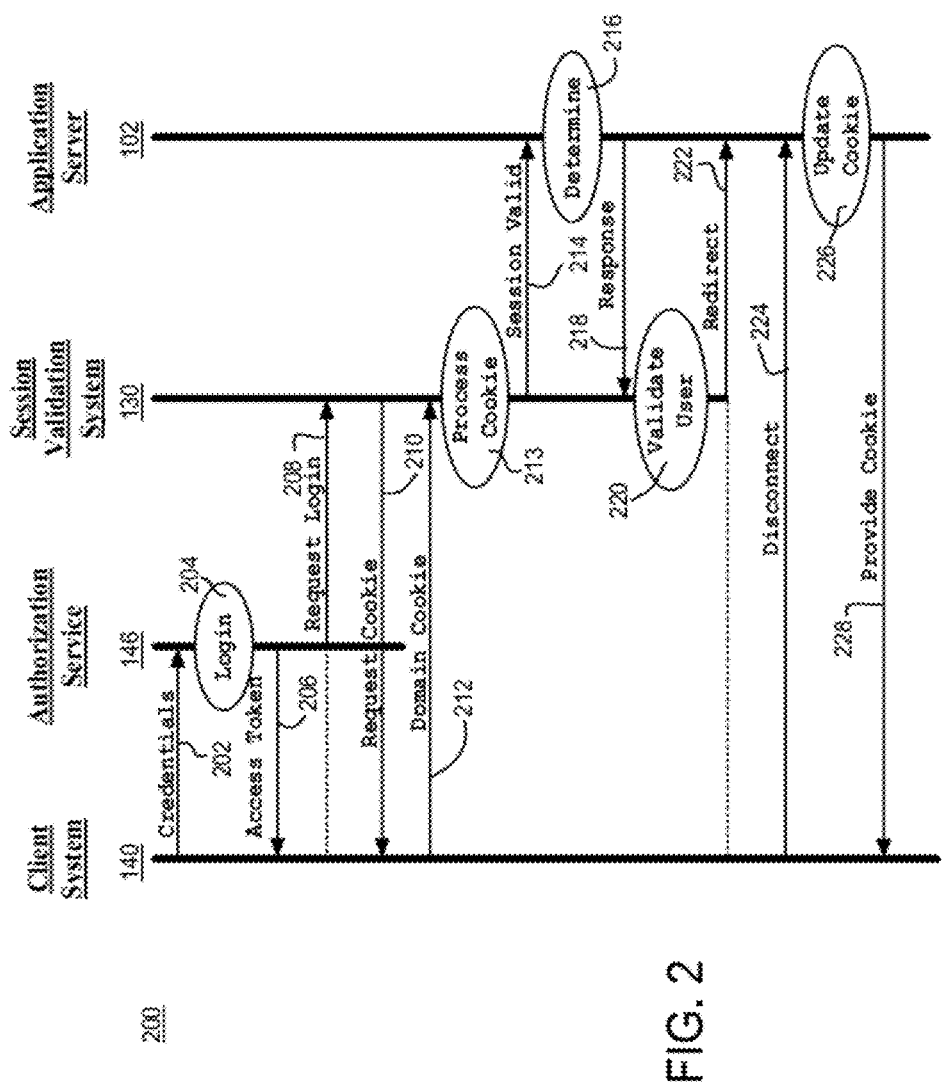

Exemplary embodiments will hereinafter be described in conjunction with the following drawing figures, wherein like numerals denote like elements, and FIG. 1 is a diagram showing an exemplary embodiment of a system for handling client sessions in a multi-tenant environment; and FIG. 2 is a diagram showing an exemplary process for handling client sessions in a multi-tenant environment.

DETAILED DESCRIPTION

Several exemplary systems and methods are described to validate user connections to one or more application servers within a multi-tenant application system. In various embodiments, a domain-level cookie that identifies the various active connections is stored on the client. As the client requests a connection to a particular application, the cookie is provided to a validation server that determines if any previously-established sessions with the multi-tenant system exist, and/or if such sessions remain active. If an active session already exists, then the client can be automatically redirected to a particular server to continue the previously-established session. If no valid prior sessions are available, then the client can be validated and a new connection to an appropriate server can be established, as desired. By providing a central validation point, multiple connections to different servers can be established and maintained, as desired. While this concept may have use in any number of situations, it may be particularly useful when used in conjunction with a "single sign-on" service such as an open authorization ("OAuth") system. Additional details of various exemplary embodiments are described below.

Turning now to the drawings and with initial reference to FIG. 1, an example of a multi-tenant application system 100 suitably includes any number of application servers 102A-C each supporting one or more separate applications 128A-I. In many embodiments, each server 102A-C supports applications 128A-I associated with different tenants based upon securely-shared data maintained in one or more databases. Users gain access to the various applications 128A-I executing within system 100 by establishing a session 110 with the application 128 over network 145 using a browser or other application 142 executing on a client system 140.

System 100 also includes a session validation system 130 that resides within the same network domain 108 as the application servers 102A-C. This validation system 130 is a computer server or the like that provides a single point of contact for clients 140 seeking to establish sessions 110 with any of the various servers 102A-C within domain 108. In the example shown in FIG. 1, session validation system 130 is shown to be accessible at the arbitrary domain name "login.salesforce.com", with each server 102 being accessible at a different subdomain of the "salesforce.com" domain 108. This allows validation system 130 to create and maintain a domain-wide cookie 144 that is readable and writable by each of the various servers 102 to maintain accurate tracking of any sessions 110 that may be established with a particular client 140.

Each client system 140 therefore maintains a hypertext transport protocol (HTTP) or similar cookie 144 that stores information about any active sessions 110A-C between the client 140 and one or more application servers 102 operating within system 100. This cookie 144 can be provided to session validation system 130 at login time or otherwise so that the validation system 130 can learn of any existing sessions 110A-C and/or verify that these existing sessions remain active.

Validation system 130 suitably communicates with each server 102A-C via a program, script, daemon or other service endpoint 122A-C, as appropriate. If the client 140 already has an active session 110A-C to an application 128 or server 102 of interest, then the client may be automatically redirected to continue that previously-established session 110 with the appropriate server 102. If multiple active sessions 110 are active, then one of the sessions 110 may be selected based upon user inputs or other factors as desired. If no previously-established sessions 110 remain active, then a new session 110 may be created as desired.

Session validation system 130 therefore provides a central contact point for all of the servers 102A-C operating within system 100 that allows previously-established sessions to continue even though the client 140 may have temporarily suspended the session with a particular server 102. This allows for better maintenance and administration of the various sessions 110 hosted by each server 102. Various embodiments may also allow users to maintain previously-established connections with one or more applications 128 without the need to login multiple times.

Various embodiments may alternately or additionally use session validation system 130 to provide a point-of-contact to a single sign-on or other authorization service 146 executing on any server, or that is otherwise available via network 145 as desired. An OAuth or similar sign-on service, for example, may accept login credentials at an access point (e.g., service 146) that verifies the user's identity and that distributes access tokens or the like that can be used to gain access to authorized services, such as system 100.

The operation of an exemplary process for validating user sessions 110 with various servers 102 in system 100 is described in detail below with respect to FIG. 2. The following discussion, however, continues to provide additional detail about the various hardware and software systems illustrated in FIG. 1.

Session validation system 130 may be implemented using any appropriate computing hardware 134, software, firmware and/or the like. In some embodiments, validation system 130 is implemented using a software application or script that is stored and executed on general-purpose computing hardware 134, such as the processor 135, memory 136 and input/output (I/O) features 137 (e.g., a network interface) that are commonly associated with a conventional computer server or other computing system. In other embodiments, validation system 130 may reside on the same computing hardware 104 used to execute and implement one or more application servers 102. Still other embodiments may implement validation system 130 using other types of hardware and/or software, including any sort of workstation-based, cloud-based, server-based and/or other computing resources that may be available. The actual data processing and algorithms described herein may be implemented using any sort of programming or scripting features, including any sort of PERL, PYTHON, RUBY or similar scripts that manually or automatically execute on any temporal basis; any sort of compiled or interpreted application, applet or the like in any source or object code format (e.g., a JAVA SERVLET application); and/or the like.

The exemplary multi-tenant application system 100 illustrated in FIG. 1 suitably includes one or more application servers 102A-C. Each of these applications servers 102A-C dynamically creates and executes one or more virtual applications 128A-I based upon data obtained from a common database that is shared between multiple tenants. Data and services generated by the virtual applications 128A-I are provided via network 145 to any number of client devices 140, as desired. In many implementations, virtual applications 128A-I are generated at run-time using a common platform that securely provides access to data in a shared database for each of the various tenants subscribing to system 100. Other implementations may generate applications 128A-I in any other manner.

In this context, a "tenant" generally refers to a group of users that shares access to common data within system 100. Tenants may represent customers, customer departments, business or legal organizations, and/or any other entities that maintain data for particular sets of users within system 100. Although multiple tenants may share access to a common server 102 and/or database, the particular data and services provided from server 102 to each tenant can be securely isolated from those provided to other tenants, as needed. The multi-tenant architecture therefore allows different sets of users to share functionality without necessarily sharing each other's data.

Each application server 102A-C in this example is implemented using one or more actual and/or virtual computing systems that collectively provide a dynamic application platform for generating virtual applications 128A-I. Each server 102A-C operates with any sort of conventional computing hardware 104A-C, such as any processor 105A-C, memory 106A-C, input/output features 107A-C and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, processing resources, communications interfaces and other features of hardware 104 using any sort of conventional or proprietary operating system. In many embodiments, server 102 may be implemented using a pod or cluster of actual and/or virtual servers operating in conjunction with each other, typically in association with conventional network communications, cluster management, load balancing and other features as appropriate. While FIG. 1 shows an example that includes three application servers 102A-C, other embodiments may include fewer or more servers 102, with each server 102 supporting any number of tenant applications 128 as desired.

Endpoints 122A-C may be implemented using any sort of software or other logic that executes on hardware 104. In various embodiments, endpoints 122A-C are implemented using a JAVA applet, using any other interpreted or compiled code in any language or format, and/or using any sort of script written in PERL, PYTHON, RUBY or any other scripting language as desired. Typically, endpoint 122A-C receives queries at a particular address, port, uniform resource locator (URL) or the like, and responds to the queries as appropriate. Endpoint 122 typically receives queries from validation system 130, for example, to determine whether a session 110 identified in a cookie 144 received at validation system 130 remains valid. Endpoint 122 then checks the session 110 and responds appropriately, as described below. Endpoint 122 may also process logout or disconnect requests, as desired.

Data and services provided by server 102 can be retrieved using any sort of personal computer, mobile telephone, tablet or other network-enabled client device 140 on network 145. Typically, the user operates a conventional browser or other client program 142 to contact server 102 via network 145 using, for example, the hypertext transport protocol (HTTP) or the like. Some embodiments may use HTTP and/or other communications based upon the TCP/IP protocol stack, although other embodiments may use other types of protocols (e.g., voice or other telephony protocols, military protocols, secure or proprietary protocols and/or the like) as appropriate.

FIG. 2 shows an exemplary process 200 for validating sessions 110 between client 140 and servers 102A-C. Generally speaking, validation system 130 is able to receive a login request 208 from the client and to obtain the cookie 144 from the client 140 (functions 210, 212) to determine if any previously-established sessions 110 are indicated (function 213). If any previously-established sessions 110 are present, then validation system 130 suitably queries the endpoint 122 on the identified server 102 (function 214) to determine if the session 110 is still active (function 216). After receiving a response 218 from the application server 102, validation system 130 suitably validates the client or user if necessary (function 220) and redirects the client 140 to establish or continue the session 110 with the appropriate server 102 (function 222). These functions may be executed by any sort of hardware, software or other logic executing within validation system 130, as appropriate. Many alternate but equivalent implementations may be supplemented or modified in any manner.

The client 140 contacts the validation system 130 in any appropriate manner. In some embodiments, the user of client 140 simply enters a URL associated with the validation system into a browser or other application 142, or clicks on a search result or other link that directs the application 142 to session validation system 130, as appropriate. As noted above, session validation system 130 typically resides on a common domain 108 as the servers 102 so that domain cookies 144 can be read and written by all of the various systems operating within the domain 108, as appropriate.

In the example illustrated in FIG. 2, client 140 is directed toward the validation system 130 by an authorization service 146. As noted above, authorization service 146 may be an OAuth or similar authorization service that appropriately receives digital credentials 202 from the client (or a user of the client), authenticates the user/client 140 to process a single login (function 204), and then provides an access token 206 or the like back to the client 140 for presentation to validation service 130, or another login system within domain 108 as desired. In various embodiments, service 146 (and/or another login service within domain 108) suitably redirects application 142 on client 140 toward verification system 130, as appropriate. This redirection may be, for example, an HTTP redirect that directs a browser or similar application 142 to discontinue the current session and to establish a new session with a different service on a different domain. To that end, authorization service 146 may be configured with the URL or other address of validation system 130 so that all requests for access to domain 108 are redirected toward the validation system (e.g., login.salesforce.com in the example of FIG. 1) rather than any particular server 102. In the case of an OAuth immediate mode login, for example, application 142 could be directed to provide access token 206 to validation system 130, which then validates the login, thereby eliminating the need to configure all of the servers 102A-C to process such logins. Other implementations could be formulated to work with other protocols and routines, or to function in any other manner.

Upon receiving a direct or redirected request for access 208 from a client 140, validation system 130 suitably requests the cookie 144 associated with domain 108 from the client 140 (function 210). Client 140 returns the domain cookie 144 (function 212) as appropriate. In various embodiments, cookie 144 is formatted as an HTTP domain cookie that is associated with domain 108 to allow validation system 130 and the various application servers 102 to receive and modify the cookie 144. In some embodiments that do not implement logout functions 224, 226, 228, however, cookie 144 may be local to the subdomain associated with validation system 130, as desired.

Validation system 130 processes the cookie 144 as appropriate (function 213). In various embodiments, validation system 130 reads the information stored within the cookie 144 to determine if any previously-established sessions with servers 102A-C are indicated. To that end, cookie 144 typically maintains appropriate information to identify a session 110 with a particular server 102. Such information may include, for example, a server identification ("ServerID") that identifies the particular server 102A-C involved in the session 110, an organization identification ("OrgID") that identifies a tenant or other client organization associated with the application 128 accessed, a user identification ("UserID") associated with the particular user, and/or any other information as desired. An example of cookie 144 used to discover previously-established sessions 110 with servers 102 within domain 108 may therefore have a format as follows:

Cookie: disco=ServerID1:OrgID1:UserID1|ServerID2:OrgID2:UserID2

In this example, the cookie named "disco" maintains server, organization and user identifiers for two different applications 128 associated with two different tenants and residing on two different servers 102. Other embodiments may use additional or alternate information, and/or may format cookie 144 in any other manner.

If cookie 144 is not present, or if no sessions 110 are indicated, then validation system 130 establishes a new session 222 with an appropriate server 102 in any manner. In various embodiments, the user and/or the client 140 is validated to ensure that access to the requested service is approved.

If the received cookie 144 indicates one or more previously-established sessions 110, then the validation service 130 suitably determines if the indicated sessions remain valid. To that end, validation system 130 suitably places a query 214 to the endpoint 122 or another appropriate service associated with server 102. In an exemplary embodiment, the query 214 may be formatted within a query that incorporates an HTTP URL or the like associated with the endpoint 122, and that provides any appropriate parameters for the query. For example, one embodiment might format a query from validation system 130 to an endpoint 122 associated with a server 102 indicated in the cookie 144 by using an HTTP URL that incorporates UserID, OrgID and/or other parameters from the cookie as desired. A query to server 102A in FIG. 1, for example, might be formatted using OrgID and UserID information from cookie 144 as follows:

https://na1.salesforce.com/services/session/
status?orgId=ooDxR1wF&userId=oo5x1NygU Other examples could be formatted in any other manner and/or could include any different parameters, as desired. In the example above, secure HTTP is used to prevent unauthorized access; other embodiments may use regular HTTP or other transport techniques, as allowed by any applicable security constraints.

The endpoint 122 or other service executing on application server 102 processes query 214 as appropriate (function 216). In various embodiments, endpoint 122 suitably verifies that the query is placed from an authorized validation service 130 by, for example, verifying that the query originated from an approved internet protocol (IP) or other address. Other embodiments may require different information or credentials from validation service 130 before processing query 214, as desired. Some embodiments may provide additional user authentication and/or authorization with validation system 130, as desired (function 220). Authentication is typically performed by checking a digital credential received from the client 140 against an entry in a database or the like. An access token received from authorization service 146, for example, could be used to authenticate a particular user or client 140. Users and/or clients 140 may be equivalently authenticated based upon username/password combinations, digital signatures or other cryptographic credentials, biometric information, or other information as desired. Although user authentication will typically take place prior to any redirection 222 or establishment of services with any of the application servers 102, the particular timing and location of any user/client authentication or authorization functions will vary from embodiment to embodiment.

If application server 102 recognizes an active session 110 with client 140 in cookie 144, then the application server 102 may provide an appropriate reply that acknowledges the connection as appropriate. In one example, the endpoint 122 provides an HTTP reply with a content type of "application/json" with a body that includes such information as the following:

{"status": true, "username": "jlee@domainname.org"}

Again, other embodiments may have any number of different formats and/or may provide different types of information, as desired.

If the application server 102 does not recognize the previously-established session 110 (or if the server 102 does not wish to continue that session for any reason), then a negative response 218 is sent. This response may simply provide an error code (e.g., error 401) so that the validation system 130 does not need to parse the response. Other embodiments, however, may provide more detailed responses (e.g., by setting the "status" field described above to "false" instead of "true") as desired.

If cookie 144 identifies multiple previously-established sessions 110, then functions 214-216 may be repeated as needed to query each of the respective servers 102 that have potentially valid connections with the client 140. If multiple valid sessions 110 remain, then validation server 102 may select one of the valid connections 110 based upon any criteria. Various embodiments might generate a user prompt to select one of the valid sessions 110, for example, or a preferred session 110 may be selected in any manner. Client 140 is then redirected 222 toward the appropriate session 110, as desired.

If only one valid session 110 remains, then some implementations may automatically resume the session 110 without further input from the user, as warranted. This automatic resumption may take place in any manner, such as by redirecting the client 140 from the validation service 130 toward the appropriate server 102 (function 222). The redirection 222 may be, for example, a conventional HTTP redirection or the like that is generated by validation system 130 so that application 142 is automatically redirected toward server 102 without further action by the user.

Various implementations may allow servers 102A-C to update information in cookie 144 as appropriate. For example, upon the establishment of a new session 110 with a server 102, either server 102 or validation service 130 may provide a new cookie that incorporates information describing the newly-established session. Upon subsequent interactions with validation system 130, the cookie 144 will reflect the newly-activated session.

Servers 102 may also update the information in cookie 144 when sessions 110 are ended, as desired. As shown in FIG. 2, the client 140 indicates an intent to logoff or otherwise discontinue the session by sending a disconnect message 224 to application server 102. The application server 102 then updates the information in the cookie 144 as appropriate. In various embodiments, the server 102 suitably retrieves the existing cookie 144 and sends a replacement cookie 144 to the client that deletes the information for the current session 110 but that leaves any other information in the cookie 144 intact. In other embodiments, the client 140 is redirected upon logout back to the validation system 130 so that the validation system 130 can update cookie 144, as desired. In either case, the updated cookie 144 may be stored by the client 140 until subsequent interactions with validation system 130 are warranted.

As noted above, the various functions and features of process 200 may be carried out with any sort of hardware, software and/or firmware logic that is stored and/or executed on any platform. Some or all of method 200 may be carried out, for example, by logic executing within one or more systems shown in FIG. 1. For example, various functions shown in FIG. 2 (e.g., functions 216, 226) may be partially or entirely implemented using endpoint 122 or other logic that is stored in memory 106 and executed by processor 105 as part of one or more application platforms 102A-C. Other features (e.g., functions 208, 210, 214, 218, 220, 222) may be partially or entirely executed using software, firmware or other logic that is stored and executed by hardware 134 or other features of validation system 130, as appropriate. The particular hardware, software and/or firmware logic that implements any of the various functions shown in FIG. 2, however, may vary from context to context, implementation to implementation, and embodiment to embodiment in accordance with the various features, structures and environments set forth herein. The particular means used to implement each of the various functions shown in FIG. 2, then, could be any sort of processing structures that are capable of executing software and/or firmware logic in any format, and/or any sort of application-specific or general purpose hardware, including any sort of discrete and/or integrated circuitry residing in any sort of host system, as desired.

Various exemplary systems and processes for validating sessions with multiple servers in a multi-tenant application service have therefore been described. The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A computer-implemented method executable by a session validation system to validate sessions between a client device and any of a plurality of servers operating within a common domain on a network, the computer-implemented method comprising:

receiving, by the session validation system, a request that is redirected to the session validation system by an OAuth authentication system in response to successful authentication of the client device by the OAuth authentication system, wherein the OAuth authentication system operates on a different domain than the common domain;

in response to the request that is redirected from the OAuth authentication system, obtaining a cookie corresponding to the common domain from the client device at the session validation system, wherein the cookie comprises a server identification that indicates one of the plurality of servers operating within the common domain having a previously-established session with the client device, and wherein the cookie further comprises other information identifying other sessions between the client device and other ones of the plurality of servers operating within the common domain;

placing a query from the session validation system to the one of the plurality of servers that is indicated by the server identification in the cookie to thereby determine if the previously-established session between the client device and the indicated server operating on the common domain is still valid;

if the previously-established session with the indicated server operating on the common domain is still valid, the session validation system redirecting the client device to the indicated server that previously handled the previously-established session with the client device to thereby continue the previously-established session between the client device and the indicated server operating on the common domain, and wherein the previously-established session is terminated by the indicated server in response to a disconnect message sent from the client to the identified one of the plurality of servers operating on the common domain, and wherein the indicated server terminates its previously-established session with the client device by sending a replacement cookie corresponding to the common domain to the client device, and wherein the replacement cookie sent to the client device by the identified server no longer identifies the previously-established session between the client device and the identified server but leaves the other information in the cookie about other sessions with other ones of the plurality of servers operating in the common domain intact; and if the previously-established session with the indicated server is not still valid, the session validation system validating an OAuth authorization token that was generated by the OAuth authentication system and delivered to the client device for relaying to the session validation system and, if the OAuth authorization token received from the client is valid, the session validation system establishing a new session between the client and one of the plurality of servers operating within the common domain.

2. The computer-implemented method of claim 1 further comprising redirecting the client device to establish a new session with one of the plurality of servers if the previously-established session is no longer valid.

3. The computer-implemented method of claim 2 further comprising validating the request to confirm that the client device is authorized to establish the new session with the one of the plurality of servers.

4. The computer-implemented method of claim 3 wherein the validating is not performed if the previously-established session is still valid.

5. The computer-implemented method of claim 3 wherein the validating comprises processing an access token obtained from an authorization service.

6. The computer-implemented method of claim 1 wherein the session validation system and each of the plurality of servers resides within a common domain of a network.

7. The computer-implemented method of claim 6 wherein the session validation system resides on a first subdomain of the common domain, and wherein each of the plurality of servers resides on separate subdomain of the common domain.

8. The computer-implemented method of claim 7 wherein the cookie is a domain cookie that is associated with the common domain, and wherein the information contained within the cookie comprises a user identification and a server identification of the identified server.

9. The computer-implemented method of claim 1 wherein the contacting comprises providing the information contained in the cookie to a service endpoint associated with the identified server.

10. The method of claim 1 wherein the identified server terminates the previously-established session without redirecting the client back to the session validation system.

11. A computer-implemented method executable by a session validation system to process sessions between a client and any of a plurality of servers operating on a common domain, the computer-implemented method comprising:

receiving a request from the client at the session validation system, wherein the request is redirected from an OAuth authorization service operating on a different domain from the common domain, wherein the OAuth authorization service generates an OAuth authorization token and provides the generated OAuth authorization token to the client;

in response to the request redirected from the OAuth authorization service, the session validation system processing a cookie associated with the common domain that is obtained from the client to recognize a plurality of previously-established sessions between the client and different servers of the plurality of servers operating within the common domain that are each identified by information contained in the cookie;

for each of the previously-established sessions with servers operating within the common domain, the session validation system contacting the server identified by the information contained in the cookie to thereby determine if the previously-established session with the server is still valid;

if the previously-established session is still valid, the session validation system redirecting the client to the same server identified by the information in the cookie that previously handled the previously-established session with the client to thereby continue the previously-established session with the server, and wherein, when the session is terminated, and wherein the previously-established session is terminated by the server identified by the information in the cookie in response to a disconnect message sent from the client, and wherein the server handling the previously-established session terminates the previously-established session with the client by sending a replacement cookie that is associated with the common domain to the client, wherein the replacement cookie no longer identifies the previously-established session with the server operating within the domain but that otherwise leaves the information in the cookie about other sessions with other ones of the plurality of servers operating within the common domain intact; and if none of the previously-established sessions are still valid, the session validation system validating a copy of the OAuth authorization token that is received from the client and, if the OAuth authorization token received from the client is authorized, the session validation system establishing a new session between the client and one of the plurality of servers operating within the common domain.

12. The computer-implemented method of claim 11 wherein if more than one of the previously-established sessions is still valid, the redirecting comprises redirecting the client from the session validation system to continue one of the previously-established sessions with one of the servers that is selected by a user of the client.

13. The computer-implemented method of claim 11 wherein the request comprises an access token obtained from the OAuth authorization service and wherein the validating comprises identifying the client using the access token.

14. The computer-implemented method of claim 13 wherein the establishing comprises updating the cookie to describe the new session.

15. The computer-implemented method of claim 11 wherein the session validation system and each of the plurality of servers resides within a common domain of a network, wherein the session validation system resides on a first subdomain of the common domain, and wherein each of the plurality of servers resides on a separate subdomain of the common domain.

16. The computer-implemented method of claim 15 wherein the cookie is a domain cookie that is associated with the common domain, and wherein the information contained within the cookie comprises a user identification and a server identification for each of the previously-established sessions.

17. A data processing system to provide each of a plurality of applications to a plurality of clients via a network in response to an OAuth authentication token that is generated by an OAuth authentication system and delivered to the client via the network, the data processing system comprising:

a plurality of application servers operating within a common domain of the network, wherein each of the plurality of application servers provides at least one of the plurality of applications via the network and wherein each of the plurality of application servers comprises a service endpoint; and a session validation server that receives a request from one of the plurality of clients via the network that is redirected from the OAuth authentication service, and that obtains a cookie associated with the common domain from the client that comprises a server identifier that identifies one of the plurality of application servers having a previously-established session with the client, and wherein the cookie further comprises other information identifying other sessions between the client and the plurality of servers operating on the common domain, and wherein the session validation server contacts the service endpoint associated with the server identifier to thereby determine if the previously-established session with the associated server is still valid, wherein the service endpoint on the identified application server receives the contact from the session validation server, determines if the previously-established session between the client and the server identified by the server identification in the cookie is still valid, and returns a response to the session validation server that indicates if the previously-established session is still valid, and if the previously-established session is still valid, the session validation server redirects the client to the application server identified by the server identifier to thereby continue the previously-established session with the client, and if none of the previously-established sessions are still valid, the session validation system validates a copy of the OAuth authorization token that is received from the client and, if the OAuth authorization token received from the client is authorized, the session validation system establishes a new session between the client and one of the plurality of servers operating within the common domain;

wherein the application server identified by the server identifier in the cookie associated with the common domain terminates the previously-established session with the client in response to a disconnect request from the client by sending a replacement cookie associated with the common domain to the client that no longer identifies the previously-established session with the client but that leaves the other information in the cookie about other sessions with other ones of the plurality of servers operating within the common domain intact.

18. The data processing system of claim 17 wherein the session validation server resides within the common domain on the network, wherein the plurality of application servers and the session validation server reside on different subdomains of the common domain, and wherein the cookie is associated with the common domain.

* * * * *